United States Patent
Liu et al.

(10) Patent No.: US 11,327,635 B1
(45) Date of Patent: May 10, 2022

(54) METHOD FOR SWITCHING AN ONLINE LIST AND A LOCAL LIST IN A SAME WINDOW, AND COMPUTING DEVICE

(71) Applicant: ZHANGYUE TECHNOLOGY CO., LTD, Beijing (CN)

(72) Inventors: Yang Liu, Beijing (CN); Min Guo, Beijing (CN); Qingfeng Wang, Beijing (CN)

(73) Assignee: ZHANGYUE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/607,375

(22) PCT Filed: Nov. 18, 2019

(86) PCT No.: PCT/CN2019/119264
§ 371 (c)(1),
(2) Date: Oct. 28, 2021

(87) PCT Pub. No.: WO2020/220649
PCT Pub. Date: Nov. 5, 2020

(30) Foreign Application Priority Data

Apr. 29, 2019 (CN) .......................... 201910356219.8

(51) Int. Cl.
 G06F 3/042 (2006.01)
 G06F 3/0482 (2013.01)
 G06F 9/451 (2018.01)
 G06F 3/0484 (2022.01)
(52) U.S. Cl.
 CPC .......... *G06F 3/0482* (2013.01); *G06F 3/0484* (2013.01); *G06F 9/451* (2018.02)

(58) Field of Classification Search
 CPC .............................. G06F 3/0482; G06F 9/451
 USPC .......................................................... 715/739
 See application file for complete search history.

(56) References Cited

U.S. PATENT DOCUMENTS

| | | | |
|---|---|---|---|
| 9,996,630 B2 * | 6/2018 | Chamberlain | G06F 16/9535 |
| 11,043,068 B2 * | 6/2021 | Fan | H04L 67/22 |
| 2008/0163284 A1 | 7/2008 | Martinez et al. | |
| 2011/0066960 A1 | 3/2011 | Suzuki | |

(Continued)

FOREIGN PATENT DOCUMENTS

| | | |
|---|---|---|
| CN | 103561344 A | 2/2014 |
| CN | 103581758 A | 2/2014 |

(Continued)

OTHER PUBLICATIONS

International Patent Application No. PCT/CN2019/119264;Int'l Search Report; dated Feb. 18, 2020; 2 pages.

*Primary Examiner* — William D Titcomb
(74) *Attorney, Agent, or Firm* — BakerHostetler

(57) ABSTRACT

The present disclosure discloses a method for switching an online list and a local list in a same window, and a computing device. Wherein the method comprises: presenting a display window in response to a trigger operation on a first list display entrance by a user, wherein list information of a first list and a list switching entrance are displayed in the display window; and refreshing the display window to display list information of a second list, in response to a trigger operation on the list switching entrance by the user; wherein the first list is a local list and the second list is an online list, or, the first list is an online list and the second list is a local list.

18 Claims, 4 Drawing Sheets

---

Presenting a display window in response to a trigger operation on a first list display entrance by a user; wherein list information of a first list and an entrance of switching between lists are displayed in the display window. — S101

Refreshing the display window to display list information of a second list, in response to a trigger operation on the entrance of switching between lists by the user; wherein the first list is a local list and the second list is an online list; or, the first list is an online list and the second list is a local list. — S102

(56) References Cited

U.S. PATENT DOCUMENTS

| | | | |
|---|---|---|---|
| 2011/0238646 A1* | 9/2011 | Chamberlain | G06F 16/9566 709/224 |
| 2011/0271230 A1* | 11/2011 | Harris | G06F 3/0482 715/810 |
| 2016/0198235 A1* | 7/2016 | Liu | H04N 21/4627 725/116 |
| 2018/0335901 A1* | 11/2018 | Manzari | G06F 3/04883 |
| 2019/0325534 A1* | 10/2019 | Perry | G06Q 50/28 |
| 2019/0370264 A1* | 12/2019 | Wang | G06Q 10/06 |
| 2019/0370805 A1* | 12/2019 | Van Os | H04W 12/06 |

FOREIGN PATENT DOCUMENTS

| | | |
|---|---|---|
| CN | 106844705 A | 6/2017 |
| CN | 108156524 A | 6/2018 |
| CN | 109375974 A | 2/2019 |
| CN | 110087120 A | 8/2019 |

\* cited by examiner

METHOD FOR SWITCHING AN ONLINE LIST AND A LOCAL LIST IN A SAME WINDOW, AND COMPUTING DEVICE

CROSS-REFERENCE TO RELATED APPLICATION

The present application is the U.S. National Stage of International Application No. PCT/CN2019/119264, filed on Nov. 18, 2019, which claims the priority of a Chinese patent application with the application number of 201910356219.8, titled as "METHOD FOR SWITCHING AN ONLINE LIST AND A LOCAL LIST IN A SAME WINDOW, AND COMPUTING DEVICE", and filed with the China Patent Office on Apr. 29, 2019, the entire content of which are incorporated herein by reference.

TECHNICAL FIELD

The present disclosure relates to the field of Internet technology, and in particular to a method for switching an online list and a local list in a same window, and a computing device.

BACKGROUND

In recent years, with the development of internet technology and the popularization of electronic terminals, it has become increasingly common to acquire network information through electronic terminals to meet needs for daily entertainment, work, or learning, and it is more typical to meet the above needs through various applications. For example, audio and video contents will be played through audio and video players, and e-books (electronic books) will be read through reading applications, etc. At the same time, these applications usually allow users to download media contents corresponding to list information of their online lists, and automatically add the list information corresponding to the downloaded media contents into a local list, so that users can acquire the downloaded media contents through the local list anytime and anywhere, without being restricted by the network environment.

However, in existing applications, the local list and the online list are displayed through different windows, respectively, and switching from a window in which either of the lists is located to a window in which the other list is located, requires multiple operations by the user. For example, for switching from a local list to an online list, at least the user needs to exit the window in which the local list is located, and then search the application for the entrance to the window in which the online list is located, and then can enter the window in which the online list is located through the entrance and via one or more trigger operations. Obviously, in the existing method of switching between the two lists, the switching path is long, and the user needs to go through multiple steps of trigger operations to complete the switching, which affects use of the user.

SUMMARY

In view of the above problems, the present disclosure is proposed in order to provide a method for switching an online list and a local list in a same window, and a computing device that overcome the above problems or at least partially solves the above problems.

According to one aspect of the present disclosure, a method for switching an online list and a local list in a same window is provided, which includes:

presenting a display window according to a trigger operation on a first list display entrance by a user; wherein list information of a first list and a list switching entrance are displayed within the display window;

enabling, according to a trigger operation on the list switching entrance by the user, the display window to refresh and display list information of a second list;

wherein the first list is a local list, and the second list is an online list, or, the first list is an online list, and the second list is a local list.

According to another aspect of the present disclosure, a computing device is provided, which includes: a processor, a memory, a communication interface, and a communication bus, wherein the processor, the memory and the communication interface communicate with each other through the communication bus;

the memory is configured to store at least one executable instruction, wherein the executable instruction causes the processor to perform the following operations:

presenting a display window according to a trigger operation on a first list display entrance by a user; wherein list information of a first list and a list switching entrance are displayed within the display window;

enabling, according to a trigger operation on the list switching entrance by the user, the display window to refresh and display list information of a second list;

wherein the first list is a local list, and the second list is an online list, or, the first list is an online list, and the second list is a local list.

According to yet another aspect of the present disclosure, a non-volatile computer-readable storage medium is provided, in which at least one executable instruction is stored, wherein the executable instruction causes a processor to perform the following operations:

presenting a display window according to a trigger operation on a first list display entrance by a user; wherein list information of a first list and a list switching entrance are displayed within the display window;

enabling, according to a trigger operation on the list switching entrance by the user, the display window to refresh and display list information of a second list;

wherein the first list is a local list, and the second list is an online list, or, the first list is an online list, and the second list is a local list.

According to still another aspect of the present disclosure, a computer program product is provided, which includes a calculation program stored on the above non-volatile computer-readable storage medium.

According to the method for switching an online list and a local list in a same window, and a computing device of the present disclosure, list information and a list switching entrance are displayed within the display window at the same time, and according to a trigger operation on the list switching entrance by the user, the online list and the local list can be switched in the same one display window, and a user does not need to complete the switching of the windows through trigger operations of multiple steps to be able to achieve the switching of the list information, so that the user can easily acquire the list information in the online list or the local list, thereby improving use experience of users.

The above description is only an overview of the technical solutions of the present disclosure. In order to be able to understand the technical means of the present disclosure more clearly, so that they can be implemented in accordance with the contents of the specification, and in order to make the above and other objectives, features and advantages of the present disclosure more obvious and understandable, specific embodiments of the present disclosure will be exemplified in the following.

BRIEF DESCRIPTION OF THE DRAWINGS

By reading the detailed description of the preferred embodiments below, various other advantages and benefits will become clear to those of ordinary skills in the art. The drawings are only used for the purpose of illustrating the preferred embodiments, and are not considered as a limitation to the present disclosure. Also, throughout the drawings, the same reference symbols are used to denote the same components. In the drawings.

DETAILED DESCRIPTION

Figure 1:
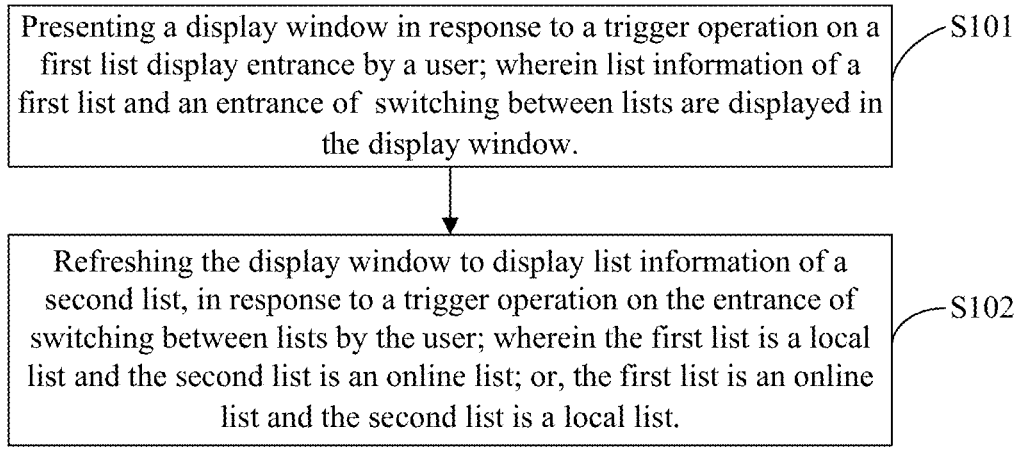
FIG. 1 shows a flowchart of a method for switching an online list and a local list in a same window according to an embodiment of the present disclosure.

Hereinafter, exemplary embodiments of the present disclosure will be described in more detail with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided in order to enable a more thorough understanding of the present disclosure and to be able to fully convey the scope of the present disclosure to those skilled in the art.

FIG. 1 shows a flowchart of a method for switching an online list and a local list in a same window according to an embodiment of the present disclosure. As shown in FIG. 1, the method includes:

a step S101: presenting a display window according to a trigger operation on a first list display entrance by a user; wherein list information of a first list and a list switching entrance are displayed within the display window.

In the present disclosure, the first list may be a local list or an online list. Wherein when the first list is a local list, the second list is an online list; or, when the first list is an online list, the second list is a local list.

Wherein the list switching entrance refers to an entrance for switching and displaying the local list and the online list in the display window.

Specifically, the local list display entrance and the online list display entrance may be the same entrance or different entrances. After receiving the trigger operation on the display entrance, it is determined to display the list information of the local list or the list information of the online list within the display window in accordance with a preset display rule. Optionally, the displayed list information is determined according to at least one of entrance information, networking environment, and default settings. For example, in the case of the same entrance, after receiving the trigger operation, the list information at the time of last exit is displayed by default.

It should be noted that the display positions of the list information of the first list and the list switching entrance in the display window will not be limited in the present disclosure. And, the specific presentation form of the list switching entrance will not be limited, for example, the list switching entrance may be a switching button or a switching option.

a step S102: enabling, according to a trigger operation on the list switching entrance by the user, the display window to refresh and display list information of a second list; wherein the first list is a local list, and the second list is an online list, or, the first list is an online list, and the second list is a local list.

Specifically, according to the triggering operation on the list switching entrance by the user, the list information of the second list is refreshed and displayed in the same display window that displays the list information of the first list. Wherein the list information displayed in the display window may be switched from the list information of the first list to the list information of the second list, through entire refreshing of the list information, that is, by hiding the list information of the first list and displaying the list information of the second list at the same time, in the display window; or, the list information displayed in the display window may be switched from the list information of the first list to the list information of the second list, through addition and deletion of part of the list information, that is, by deleting extra information in the list information of the first list than the list information of the second list, and newly adding extra information in the list information of the second list than the list information of the first list.

For example, the user will perform a trigger operation from the entrance of "My Downloads", and at this time, 3 items of the list information of the local list and the list switching entrance are displayed within the display window; when the user performs a trigger operation from the list switching entrance in the display window, 10 items of the list information of the online list in total can be displayed in the display window.

It should be noted here that when switching to display the list information of the second list, the list switching entrance will still displayed in the display window, so that the user can perform the trigger operation of switching from the second list to the first list.

According to the method for switching an online list and a local list in a same window provided by the present embodiment, list information and a list switching entrance are displayed within the display window at the same time, and according to a trigger operation on the list switching entrance by the user, the online list and the local list can be switched in the same one display window, and a user does not need to complete the switching of the windows through trigger operations of multiple steps to be able to achieve the switching of the list information, so that the user can easily acquire the list information in the online list or the local list, thereby improving use experience of users.

Figure 2:
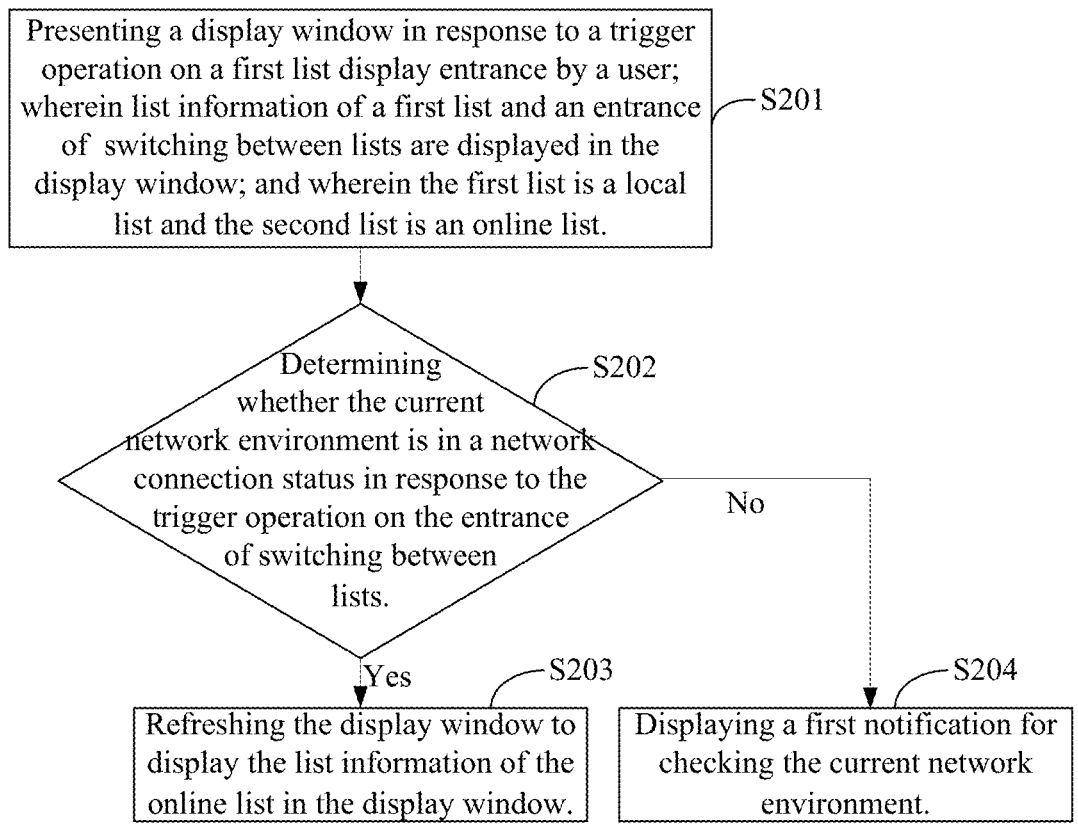
FIG. 2 shows a flowchart of a method for switching an online list and a local list in a same window according to another embodiment of the present disclosure.

FIG. 2 shows a flowchart of a method for switching an online list and a local list in a same window according to another embodiment of the present disclosure. The case where the first list is a local list and the second list is an online list will mainly be described in the present embodiment. As shown in FIG. 2, the method includes:

a step S201: presenting a display window according to a trigger operation on a first list display entrance by a user; wherein list information of a first list and a list switching entrance are displayed within the display window; wherein the first list is a local list and the second list is an online list.

Wherein, when the first list is a local list, the first list display entrance is the local list display entrance.

Specifically, the local list display entrance may be of one or more, and preset local entrance information of the one or more local list display entrances will be acquired respectively, and when entrance information of the received trigger operation is consistent with the preset local entrance information, it is determined that a trigger operation on the local list display entrance is received, and a display window will be presented at this time, and the list information of the local list and the list switching entrance are displayed within the display window.

For example, the preset local entrance information is entrance information corresponding to "My Downloads", and then when the user performs a trigger operation from "My Downloads", the list information of the local list will be displayed within the display window.

In addition, for the case where the same entrance exists for the local list display entrance and the online list display entrance, when a trigger operation for the same entrance is received, it is necessary to further determine whether it meets condition for displaying the list information of the local list according to networked environment or default setting. Optionally, it is determined whether the current network environment is located in a networked environment, and if not, it is determined that the condition for displaying the list information of the local list is met; or, it is determined whether the default setting for performing a trigger operation on the same entrance is to display the list information of the local list, and if so, it is determined that the condition for displaying the list information of the local list is met, wherein default setting input by the user may be received, so as to display in accordance with the input of the user.

For example, for a reading application, an audio catalog (i.e. the display window) of a certain book will be entered from a selection entrance for book in "My Bookshelf", and the displayed list information may be the list information at the time of last exit, or the list information of the local list may be displayed when there is no network connection, and the list information of the online list may be displayed when there is network connection.

a step S202: determining whether the current network environment is located in a networked environment when a trigger operation on the list switching entrance is received; if yes, a step S203 will be performed; if not, a step S204 will be performed.

In the present embodiment, the first list is a local list, and through a trigger operation on the list switching entrance, then it can be switched to display the list information of the online list, so that the user quickly acquires more online information, for example, acquires chapter information of updated chapters of a book.

Specifically, it is determined whether the current network environment is located in a networked environment, and if so, the list information of the online list can be acquired through the network environment, and at this time, the condition for displaying the list information of the online list is met, and the step S203 will be executed to switch to the online list for display. If not, the list information of the online list cannot be acquired, and the step S204 will be executed to perform a networking prompt.

a step S203: refreshing and displaying the list information of the online list in the display window.

When it is located in a networked environment, the list information of the online list is acquired, and in the display window, the display of the list information of the local list will be hidden, and the list information of the online list will be displayed.

Specifically, the list information of the online list will be acquired in the following manner: In some optional embodiments, media resource associated with the local list may be determined, and the online list corresponding to the media resource may be queried, and then the real-time list information of the online list may be obtained, wherein the media resource associated with the local list refers to the media resource to which the list information of the local list belongs, and the online list corresponding to the media resource refers to a list that presents online catalog information of the media resource. Or, in other optional embodiments, list association of the online list and the local list may be pre-established with a media resource as a unit, and when switching, the online list corresponding to the local list can be queried according to the list association, and then the corresponding online list can be quickly determined, which is of benefit to improve efficiency of acquiring the list information of the online list.

For example, the list information of the local list d displayed in the display window before switching is the titles of two items of downloaded media contents (i.e. audio contents) of "White Deer Plain", which respectively are: Audio 1 and Audio 4, and it is determined that the media resource associated with the current local list d is the book "White Deer Plain", and it is found that the list that presents the online catalog information of the "White Deer Plain" is the online list o, and the acquired list information of the online list o is the audio titles of all 120 sections of audio contents of the "White Deer Plain", which respectively are: Audio 1 to Audio 120, and at this time, 120 titles will be displayed in the display window, which respectively are: Audio 1 to Audio 120.

Further, for the case of automatic switching of media contents (non-manual switching), after the playing of the media contents being played ends, the next item of media contents to be played will be determined according to the current list information presented in the display window. In the present embodiment, after the display is refreshed, the list information of the online list will be displayed in the display window, and if the played contents are automatically switched at this time, the media contents corresponding to the list information in accordance with the online list will be played, and the next item of media contents to be played will be determined from the media contents corresponding to the list information of the online list, and the playing will no longer be performed according to the media contents corresponding to the list information of the local list. The example of the media resource being the book "White Deer Plain" above will still be exemplified. If the media contents corresponding to Audio 1 are currently played (including being played or playing being paused) when the list is switched, after it is switched to display the list information of the online list o, then the playing will be performed in accordance with the media contents corresponding to the list information of the online list o, for example, after the media contents corresponding to the Audio 1 are played, the media content corresponding to Audio 2 will be played, instead of the media contents corresponding to Audio 4 being played. Through this kind of playing method, after switching, more media contents can be played according to the list information of the online list without being limited by the local list.

In the present embodiment, the media resource is composed of multiple items of media contents, wherein the media contents are a unit data source for playing, and each item of list information points to a unit data source. For example, if the media resource is a book, each item of list information may be the chapter title of one chapter of the book, and then the media contents corresponding to each item of list information are the chapter contents (text contents, audio contents, etc.) corresponding to the corresponding chapter title; for another example, if the media resource is a drama, each item of list information may be the episode title of each episode of the drama (episode 01, etc.), and then the media contents corresponding to each item of list information are the episode contents corresponding to the corresponding episode (video contents, line contents, etc.).

a step S204: displaying a first prompt information for checking the networked environment.

Wherein the first prompt information may be displayed in the form of a pop-up window, which will not affect the contents displayed in the display window.

When it is not located in a networked environment, no more online information can be acquired. At this time, the user will be prompted to check the networked environment, and it will be detected in real time whether the network environment has changed, and when the network environment is changed to be located in a networked environment, the list information of the online list will be refreshed and displayed in the display window.

According to the method for switching an online list and a local list in a same window provided by the present embodiment, for the case where the first list is a local list and the second list is an online list, after the list information of the local list and the list switching entrance are displayed in the display window, according to the trigger operation on the list switching entrance by the user, the list information of the online list can be refreshed and displayed in the display window, which realize easy switching from the local list to the online list; and after switching to the online list, the media contents corresponding to the list information of the online list will be played, so that the user can acquire more media contents corresponding to the list information, which is in the online list but not in the local list.

Figure 3:
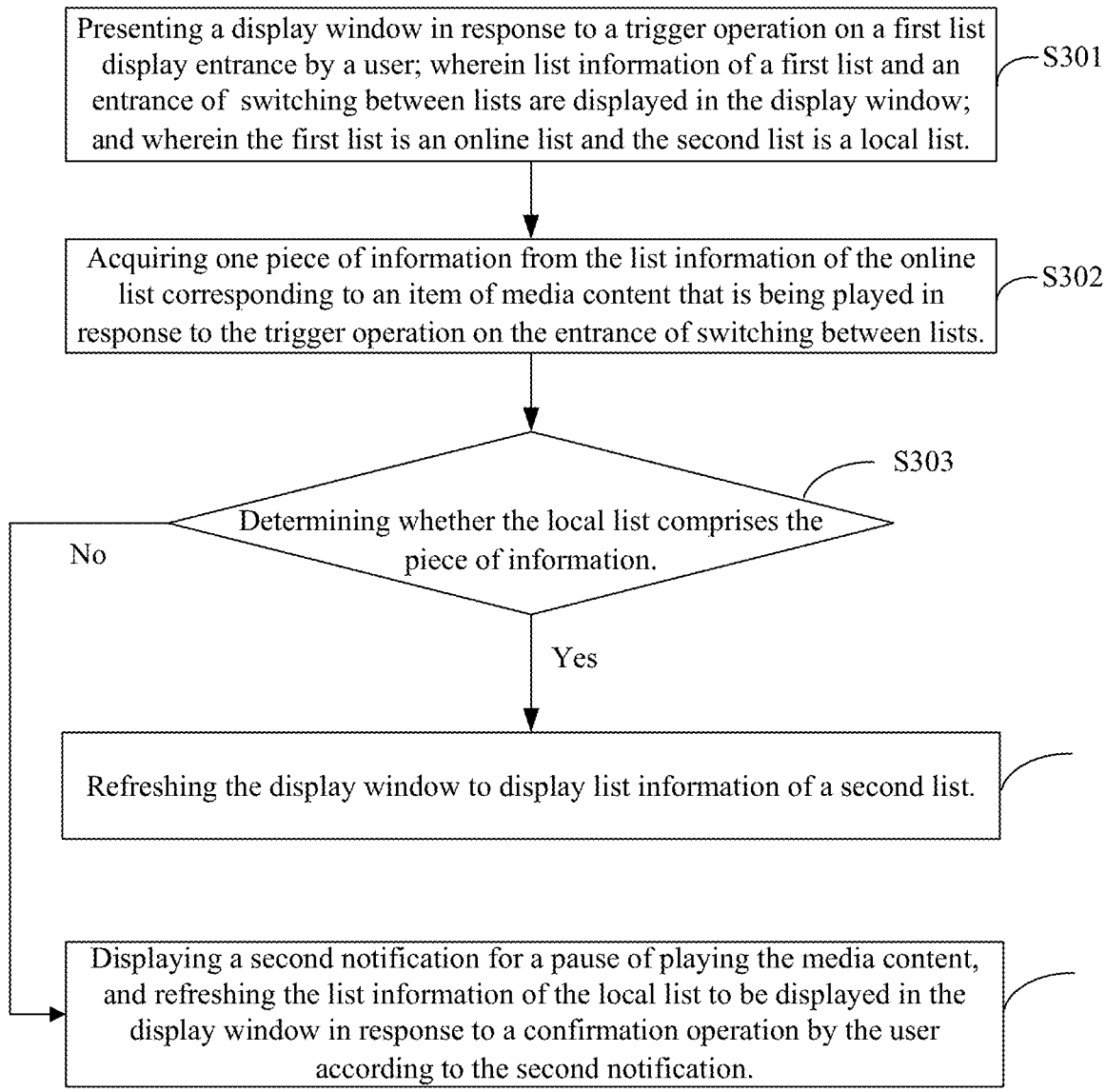
FIG. 3 shows a flowchart of a method for switching an online list and a local list in a same window according to yet another embodiment of the present disclosure.

FIG. 3 shows a flowchart of a method for switching an online list and a local list in a same window according to yet another embodiment of the present disclosure. The case where the first list is an online list and the second list is a local list will mainly be described in the present embodiment. As shown in FIG. 3, the method includes:

a step S301: presenting a display window according to a trigger operation on a first list display entrance by a user; wherein list information of a first list and a list switching entrance are displayed within the display window; wherein the first list is an online list and the second list is a local list.

Wherein, when the first list is an online list, the first list display entrance is the online list display entrance. And, the online list display entrance may also be of one or more, and preset online entrance information of the one or more online list display entrances will be acquired respectively, and when entrance information of the received trigger operation is consistent with the preset online entrance information, it is determined that a trigger operation on the online list display entrance is received, and a display window will be presented at this time, and the list information of the online list and the list switching entrance are displayed within the display window.

In some optional embodiments of the present disclosure, when the list information of the online list is displayed in the display window, when there is at least one item of media contents that has been downloaded, the list switching entrance will be displayed at the same time. Specifically, when a trigger operation on the online list display entrance is received, it is determined whether there is at least one item of downloaded media contents corresponding to the list information of the online list; if there is at least one item of downloaded media contents corresponding to the list information of the online list, then a display window will be presented; wherein the list information of the online list and the list switching entrance are displayed within the display window. For the currently accessed media contents, such as an e-book, a music album, a TV serie, etc., when there is at least one item of downloaded media contents of the media contents, the list information of the online list and the list switching entrance will be displayed in the display window at the same time, so that the user switches to the local list to acquire at least one item of media contents that has been downloaded. And, if there is no at least one item of downloaded media contents corresponding to the list information of the online list, then a display window will be presented; wherein the list information of the online list is displayed within the display window. If there is no at least one item of downloaded media contents, the list switching entrance will not be displayed, so as to reduce interference to the user's operations.

In addition, for the case where the same entrance exists for the local list display entrance and the online list display entrance, the description of the related contents of the step S201 in the embodiment corresponding to FIG. 2 can be referred to, to set the corresponding condition for displaying the list information of the online list, and to determine whether to display the list information of the table of online category in the display window according to the condition.

a step S302: acquiring, when a trigger operation on the list switching entrance is received, information item corresponding to the media content being played from the list information of the online list.

In the present embodiment, when a trigger operation on the list switching entrance is received, it is detected whether there are currently media contents being played, and if there are media contents being played, then the playing processing of the media contents being played will be further performed, so as to only play the media contents corresponding to the list information displayed in the display window after the switching is completed. If there is no media content being played, the display window can be refreshed to display the list information of the local list, which will not affect the playing of the media contents.

Specifically, when there are media contents being played, information item corresponding to the media contents being played will be acquired from the list information of the online list, so as to match the information item with the information item of the local list to determine whether the media contents being played can be continued to be played.

For example, the list information of the online list includes the online catalog information Audio 1 to Audio 120 of the "White Deer Plain", and when a trigger operation on the list switching entrance is received, it is detected that the media contents m corresponding to Audio 7 are being played, and then the information item corresponding to the media contents x, namely the Audio 7, will be acquired.

a step S303: determining whether the list information of the local list includes the information item; if yes, a step S304 will be performed; if not, a step S305 will be performed.

Specifically, the acquired information item will be matched with an information item included in the list information of the local list to determine whether the information item is included in the list information of the local list. Wherein the names of the information items may be matched. If the names of the information items are the same, the acquired information item is included; for example, the list information of the local list includes three information items: Audio 1, Audio 4 and Audio 7, and then the name of the acquired Audio 7 will be matched with the names of the Audio 1, the Audio 4 and the Audio 7, respectively; or, in the case where the names are matched, the media contents corresponding to the information items will be further matched to improve the accuracy of the matching result. For example, the media contents x corresponding to the Audio 7 will be matched with the media contents y in the list information of the local list, which correspond to the Audio 7.

In addition, in some other embodiments of the present disclosure, the information item corresponding to the media contents being played may also not be acquired, but the media contents being played may be directly matched with at least one item of media contents corresponding to the list information of the local list, so as to determine whether the list information of the local list includes an information item.

a step S304: enabling the display window to refresh and display the list information of the local list.

If the list information of the local list includes an information item, then the display window will be enabled to refresh and display the list information of the local list, and at the same time, the media contents being played may be continued to be played.

a step S305: displaying a second prompt information for pausing playing of the media contents being played, and refreshing and displaying the list information of the local list in the display window according to a confirmation operation on the second prompt information by the user.

Similarly, the second prompt information may be displayed in the form of a pop-up window, which will not affect the contents displayed in the display window.

If the list information of the local list does not include the acquired information item, the user will be prompted that it needs to pause the playing of the media contents being played, so as to enable the list information of the local list to be switched and display. And, after the user confirms that the playing is paused, the list information of the local list will be refreshed and displayed in the display window. After that, the user can also perform a trigger operation on the list switching entrance to switch and display the list information of the online list.

Similarly, in the above steps S304 and S305, the list information of the local list can be acquired and displayed according to the association between the online list and the local list, or according to the correspondence between the local list and the online list with the media resource. The specific principle and process of are the same as those for acquiring the list information of the online list in the embodiment corresponding to FIG. 2, and the description of the related contents of the step S203 can be referred to.

Same as the embodiment corresponding to FIG. 2, for the case of automatic switching of media contents (non-manual switching), after the playing of the media contents being played ends, the next item of media contents to be played will be determined according to the current list information presented in the display window. In the present embodiment, after the display is refreshed, the list information of the local list will be displayed in the display window, and if the played contents are automatically switched at this time, the media contents corresponding to the list information in accordance with the local list will be played, and the next item of media contents to be played will be determined from the media contents corresponding to the list information of the local list, and the playing will no longer be performed according to the media contents corresponding to the list information of the online list. Through this kind of playing method, after switching, only the downloaded media contents can be played, so as to save user traffic.

According to the method for switching an online list and a local list in a same window provided by the present embodiment, for the case where the first list is an online list and the second list is a local list, after the list information of the online and the list switching entrance are displayed in the display window, after the trigger operation on the list switching entrance by the user is received, it can be detected whether there are currently media contents being played, and when there are media contents being played, the way for switching will be determined through information item matching, wherein when the matching result shows that the list information of the local list includes an information item corresponding to the media contents being played, it needs to performing switching when the user confirms that the playing of the media contents being played can be paused, so as to meet the playing needs of the user; and, after switching to the local list, only the media contents corresponding to the list information of the local list will be played, which saves the user traffic.

Figure 4:
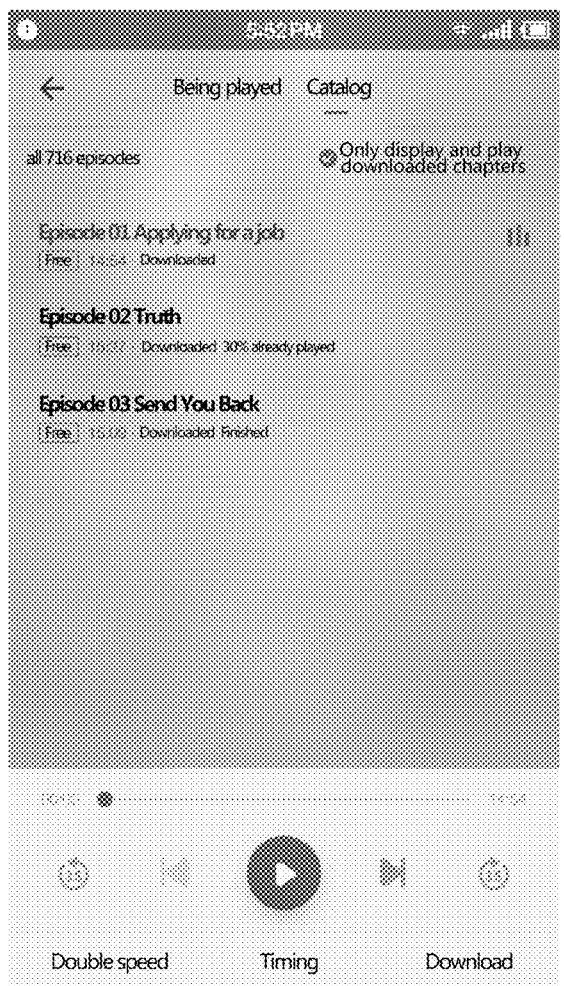
FIG. 4 shows a schematic diagram of displaying list information of a local list in a display window in a specific example.
Figure 5:
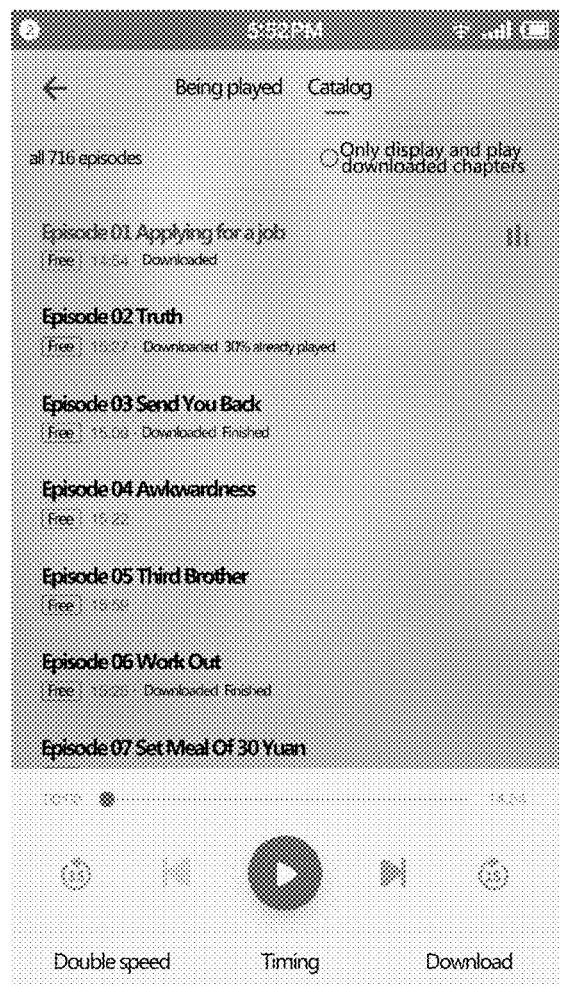
FIG. 5 shows a schematic diagram of displaying list information of an online list in a display window in a specific example.

In order to facilitate the understanding of the solutions of the present disclosure, one example is used below to illustrate specific effects. FIG. 4 shows a schematic diagram of displaying list information of a local list in a display window in one specific example, FIG. 5 shows a schematic diagram of displaying list information of an online list in a display window in one specific example. As shown in FIG. 4, a local list and a list switching entrance are displayed in the display window, wherein the list information of the local list includes the titles of the downloaded media contents, playing progress and download information. For example, the title of episode 03 is Send you back, the playing progress is finished, and the download information is downloaded, and the list switching entrance is the check box for "Only display and play downloaded chapters". When the check of the list switching entrance is removed, the list information of the online list will be refreshed and displayed in the display window. As shown in FIG. 5, the list information of the online list includes the titles, playing progresses and download information of all 716 episodes of media contents, and at this time, the user can view more online information, for example, view the related information of episode 04 to episode 716, which are not downloaded.

An embodiment of the present disclosure provides a non-volatile computer-readable storage medium, in which at least one executable instruction is stored, wherein the computer-executable instruction may be configured to execute the method for switching an online list and a local list in a same window in any of the foregoing method embodiments.

The executable instruction specifically may be configured to cause a processor to perform the following operations:

presenting a display window according to a trigger operation on a first list display entrance by a user; wherein list information of a first list and a list switching entrance are displayed within the display window;

enabling, according to a trigger operation on the list switching entrance by the user, the display window to refresh and display list information of a second list;

wherein the first list is a local list, and the second list is an online list, or, the first list is an online list, and the second list is a local list.

In an alternative implementation, if the first list is a local list and the second list is an online list, the executable instruction further causes the processor to perform the following operations:

determining whether the current network environment is located in a networked environment when a trigger operation on the list switching entrance is received;

refreshing and displaying the list information of the online list in the display window if it is located in a networked environment.

In an alternative implementation, if it is not located in a networked environment, the executable instruction further causes the processor to perform the following operation: displaying a first prompt information for checking the networked environment in the display window.

In an alternative implementation, if the first list is an online list and the second list is a local list, the executable instruction further causes the processor to perform the following operation:

determining, when a trigger operation on an online list display entrance is received, whether there is at least one piece of media content corresponding to list information of a downloaded online list; if so, presenting a display window; wherein list information of the online list and the list switching entrance are displayed within the display window.

In an alternative implementation, if there is no at least one piece of media content corresponding to the list information of the downloaded online list, the executable instruction further causes the processor to perform the following operation:

presenting a display window; wherein list information of the online list is displayed in the display window.

In an alternative implementation, if the first list is an online list and the second list is a local list, the executable instruction further causes the processor to perform the following operations:

acquiring, when a trigger operation on the list switching entrance is received, information item corresponding to the media content being played from the list information of the online list;

determining whether the list information of the local list includes the information item; if not, displaying a second prompt information for pausing playing of the media content being played in the display window;

refreshing and displaying the list information of the local list in the display window according to a confirmation operation on the second prompt information by the user.

In an alternative implementation, the executable instruction causes the processor to perform the following operation:

determining the next media content to be played according to the current list information presented in the display window after the playing of the media content being played ends.

Figure 6:
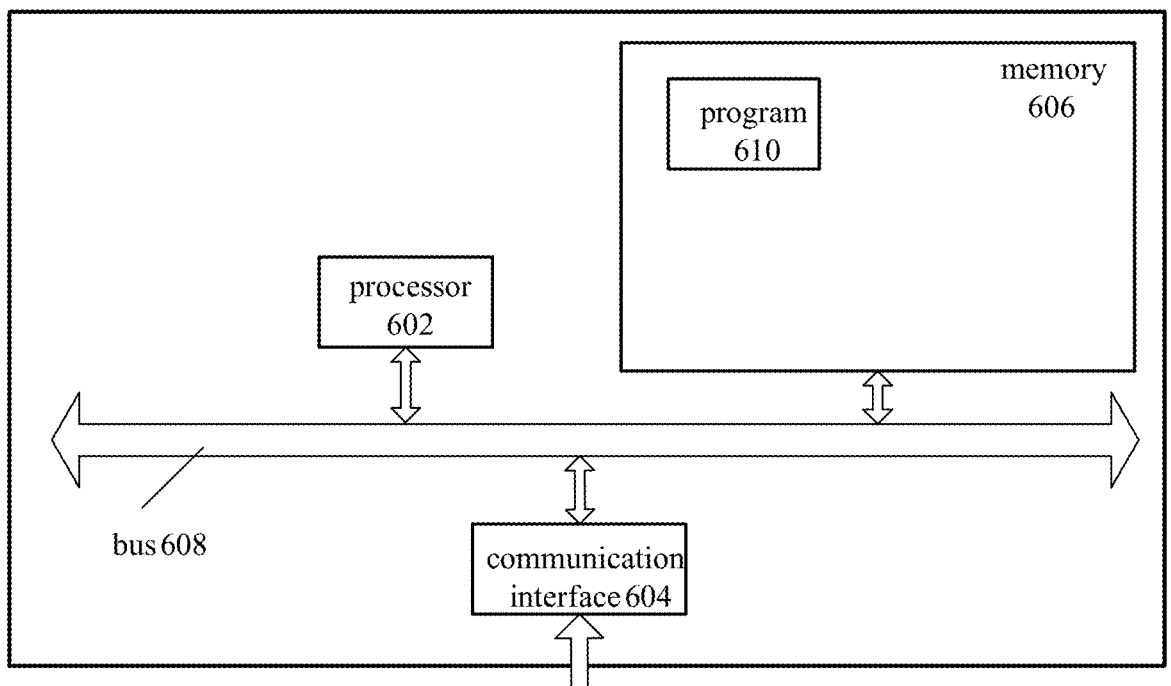
FIG. 6 shows a schematic structural diagram of a computing device according to an embodiment of the present disclosure.

FIG. 6 shows a schematic structural diagram of a computing device according to an embodiment of the present disclosure, and the specific implementation of the computing device will not be limited by the specific embodiments of the present disclosure.

As shown in FIG. 6, the computing device may include: a processor 602, a Communications Interface 604, a memory 606, and a communication bus 608.

Wherein:

The processor 602, the communication interface 604 and the memory 606 communicate with each other through the communication bus 608.

The communication interface 604 is configured to communicate with other devices such as network elements such as clients or other servers and the like.

The processor 602 is configured to execute a program 610, and specifically can execute the relevant steps in the above-described embodiments of the method for switching an online list and a local list in a same window.

Specifically, the program 610 may include a program code, which includes a computer operation instruction.

The processor 602 may be a central processing unit CPU, or an Application Specific Integrated Circuit (ASIC), or one or more integrated circuits configured to implement the embodiments of the present disclosure. The one or more processors included in the computing device may be the same type of processors, such as one or more CPUs; or may also be different types of processors, such as one or more CPUs and one or more ASICs.

The memory 606 is configured to store the program 610. The memory 606 may include a high-speed RAM memory, and may also include a non-volatile memory, such as at least one disk memory.

The program 610 specifically may be configured to cause the processor 602 to perform the following operations:

presenting a display window according to a trigger operation on a first list display entrance by a user; wherein list information of a first list and a list switching entrance are displayed within the display window;

enabling, according to a trigger operation on the list switching entrance by the user, the display window to refresh and display list information of a second list;

wherein the first list is a local list, and the second list is an online list, or, the first list is an online list, and the second list is a local list.

In an alternative implementation, if the first list is a local list and the second list is an online list, the program 610 specifically may be further configured to cause the processor 602 to perform the following operations:

determining whether the current network environment is located in a networked environment when a trigger operation on the list switching entrance is received;

refreshing and displaying the list information of the online list in the display window if it is located in a networked environment.

In an alternative implementation, if it is not located in a networked environment, the program 610 specifically may be further configured to cause the processor 602 to perform the following operation: displaying a first prompt information for checking the networked environment in the display window.

In an alternative implementation, if the first list is an online list and the second list is a local list, the program 610 specifically may be further configured to cause the processor 602 to perform the following operation:

determining, when a trigger operation on an online list display entrance is received, whether there is at least one piece of media content corresponding to list information of a downloaded online list; if so, presenting a display window; wherein list information of the online list and the list switching entrance are displayed within the display window.

In an alternative implementation, if there is no at least one piece of media content corresponding to the list information of the downloaded online list, the program 610 specifically may be further configured to cause the processor 602 to perform the following operation:

presenting a display window; wherein list information of the online list is displayed in the display window.

In an alternative implementation, if the first list is an online list and the second list is a local list, the program 610 specifically may be further configured to cause the processor 602 to perform the following operations:

acquiring, when a trigger operation on the list switching entrance is received, information item corresponding to the media content being played from the list information of the online list;

determining whether the list information of the local list includes the information item; if not, displaying a second prompt information for pausing playing of the media content being played in the display window;

refreshing and displaying the list information of the local list in the display window according to a confirmation operation on the second prompt information by the user.

In an alternative implementation, the program 610 specifically may be further configured to cause the processor 602 to perform the following operation:

determining the next media content to be played according to the current list information presented in the display window after the playing of the media content being played ends.

The algorithms and displays provided here are not inherently related to any particular computer, virtual system or other devices. Various general-purpose systems can also be used together with the teaching based on this. According to the above description, the structure required to construct this type of system is obvious. In addition, the present disclosure is not directed to any specific programming language. It should be understood that various programming languages can be used to implement the contents of the present disclosure described herein, and the above description of a specific language is for the purpose of disclosing the best embodiments of the present disclosure.

In the specification provided here, a lot of specific details are explained. However, it can be understood that the embodiments of the present disclosure can be practiced without these specific details. In some instances, well-known methods, structures and technologies are not shown in detail, so as not to obscure the understanding of the present specification.

Similarly, it should be understood that in order to simplify the present disclosure and help understand one or more of the various disclosed aspects, in the above description of the exemplary embodiments of the present disclosure, the various features of the present disclosure are sometimes grouped together into a single embodiment, figure or its description. However, the disclosed method should not be interpreted as reflecting the intention that the claimed disclosure requires more features than those explicitly disclosed in each claim. More precisely, as reflected in the claims, the disclosed aspect lies in less than all the features of a single embodiment disclosed forgoing. Therefore, a claim following a specific embodiment are thus explicitly incorporated into the specific embodiment, wherein each claim itself serves as a separate embodiment of the present disclosure.

Those skilled in the art can understand that it is possible to adaptively change the modules in the device in an embodiment and provide them in one or more devices different from the embodiment. The modules or units or components in an embodiment can be combined into one module or unit or component, and in addition, they can be divided into multiple sub-modules or sub-units or sub-components. Except that at least some of such features or processes or units are mutually exclusive, all features disclosed in the present specification (including the accompanying claims, abstract and drawings) and all processes or units of any method or device thus disclosed can be combined in any combination. Unless expressly stated otherwise, each feature disclosed in the present specification (including the accompanying claims, abstract and drawings) can be replaced by an alternative feature providing the same, equivalent or similar purpose.

In addition, those skilled in the art can understand that although some embodiments described herein include certain features included in other embodiments, rather than other features, the combination of features of different embodiments means that they are within the scope of the present disclosure and form different embodiments. For example, in the claims, any one of the claimed embodiments can be used in any combination.

It should be noted that the above-described embodiments illustrate the present disclosure, rather than limit the present disclosure, and those skilled in the art can design alternative embodiments without departing from the scope of the appended claims. In the claims, any reference signs placed between parentheses should not be constructed as limitation to the claims. The word "comprising" or "comprises" or "comprise" does not exclude the presence of elements or steps not listed in the claims. The word "a" or "an" preceding an element does not exclude the presence of multiple such elements. The present disclosure can be realized by means of hardware including several different elements and by means of a suitably programmed computer. The use of the words first, second, and third, etc. do not indicate any order. These words can be interpreted as names.

What is claimed is:

1. A method for switching an online list and a local list in a same window, comprising:
   presenting a display window in response to a trigger operation on a first list display entrance by a user, wherein list information of a first list and an entrance of switching between lists are displayed in the display window;
   refreshing the display window to display list information of a second list in response to a trigger operation on the entrance of switching between lists by the user;
   wherein the first list is a local list or an online list, and the second list is the online list or the local list;
   wherein when the first list is the online list and the second list is the local list, before the refreshing the display window to display list information of a second list, the method further comprises:
   acquiring one piece of information from the list information of the online list corresponding to an item of media content that is being played in response to the trigger operation on the entrance of switching between lists;
   determining whether the local list comprises the piece of information;
   displaying a notification for a pause of playing the media content in response to determining that the local list does not comprise the piece of information; and
   refreshing the list information of the local list to be displayed in the display window in response to a confirmation operation by the user according to the notification.

2. The method according to claim 1, wherein when the first list is the local list and the second list is the online list, before the refreshing the display window to display list information of a second list, the method further comprises:
  determining whether a current network environment is in a network connection status in response to the trigger operation on the entrance of switching between lists.

3. The method according to claim 2, wherein when the current network environment is not in the network connection status, the method further comprises displaying another notification for checking the current network environment.

4. The method according to claim 1, wherein when the first list is the online list and the second list is the local list, the presenting a display window in response to a trigger operation on a first list display entrance further comprises:
  determining whether there is at least one item of media content corresponding to at least one piece of information in the online list that has been downloaded in response to the trigger operation on the first list display entrance; and
  presenting the display window in which the list information of the online list and the entrance of switching between lists are displayed in response to determining there is the at least one item of media content corresponding to the at least one piece of information in the online list that has been downloaded.

5. The method according to claim 4, wherein when there is not the at least one item of media content corresponding to the at least one piece of information in the online list that has been downloaded, the method further comprises presenting the display window in which the list information of the online list is displayed.

6. The method according to claim 1, further comprising:
  determining a next item of media content to be played after the item of media content is finished based on current list information presented in the display window.

7. A computing device, comprising: a processor, a memory, a communication interface and a communication bus, wherein the processor, the memory and the communication interface communicate with each other through the communication bus, wherein the memory is configured to store executable instructions that upon execution cause the processor to perform operations, the operations comprising:
  presenting a display window in response to a trigger operation on a first list display entrance by a user, wherein list information of a first list and an entrance of switching between lists are displayed in the display window;
  refreshing the display window to display list information of a second list in response to a trigger operation on the entrance of switching between lists by the user;
  wherein the first list is a local list or an online list, and the second list is the online list or the local list;
  wherein when the first list is the online list and the second list is the local list, before the refreshing the display window to display list information of a second list, the method further comprises:
  acquiring one piece of information from the list information of the online list corresponding to an item of media content that is being played in response to the trigger operation on the entrance of switching between lists;
  determining whether the local list comprises the piece of information;
  displaying a notification for a pause of playing the media content in response to determining that the local list does not comprise the piece of information; and
  refreshing the list information of the local list to be displayed in the display window in response to a confirmation operation by the user according to the notification.

8. The computing device according to claim 7, wherein when the first list is the local list and the second list is the online list, the operations further comprise:
  determining whether a current network environment is in a network connection status in response to the trigger operation on the entrance of switching between lists; and
  in response to determining that the current network environment is in the network connection status, refreshing the display window to display the list information of the second list.

9. The computing device according to claim 8, wherein when the current network environment is not in the network connection status, the operations further comprise displaying another notification for checking the current network environment in the display window.

10. The computing device according to claim 7, wherein when the first list is the online list and the second list is the local list, the operations further comprise:
  determining whether there is at least one item of media content corresponding to at least one piece of information in the online list that has been downloaded in response to the trigger operation on the first list display entrance; and
  presenting the display window in which the list information of the online list and the entrance of switching between lists are displayed in response to determining there is the at least one item of media content corresponding to the at least one piece of information in the online list that has been downloaded.

11. The computing device according to claim 10, wherein when there is not the at least one item of media content corresponding to the at least one piece of information in the online list that has been downloaded, the method further comprises presenting the display window in which the list information of the online list is displayed.

12. The computing device according to claim 7, wherein the operations further comprise:
  determining a next item of media content to be played after the item of media content is finished based on current list information presented in the display window.

13. A non-transitory computer readable storage medium storing executable instructions, wherein the executable instructions upon execution by a processor cause the processor to perform operations comprising:
  presenting a display window in response to a trigger operation on a first list display entrance by a user, wherein list information of a first list and an entrance of switching between lists are displayed in the display window;
  refreshing the display window to display list information of a second list in response to a trigger operation on the entrance of switching between lists by the user;
  wherein when the first list is an online list and the second list is a local list, before the refreshing the display window to display list information of a second list, the operations further comprise:
  acquiring one piece of information from the list information of the online list corresponding to an item of media content that is being played in response to the trigger operation on the entrance of switching between lists;

determining whether the local list comprises the piece of information;

displaying a notification for a pause of playing the media content in response to determining that the local list does not comprise the piece of information; and refreshing the list information of the local list to be displayed in the display window in response to a confirmation operation by the user according to the notification.

14. The non-transitory computer readable storage medium of claim 13, wherein when the first list is the local list and the second list is the online list, the operations further comprise:

determining whether a current network environment is in a network connection status in response to the trigger operation on the entrance of switching between lists; and refreshing the display window to display the list information of the second list in response to determining that the current network environment is the network connection status.

15. The non-transitory computer readable storage medium of claim 14, wherein when the current network environment is not in the network connection status, the operations further comprise displaying another notification for checking the current network environment.

16. The non-transitory computer readable storage medium of claim 13, wherein when the first list is the online list and the second list is the local list, the presenting a display window in response to a trigger operation on a first list display entrance further comprises:

determining whether there is at least one item of media content corresponding to at least one piece of information in the online list that has been downloaded in response to the trigger operation on the first list display entrance; and presenting the display window in which the list information of the online list and the entrance of switching between lists are displayed in response to determining there is the at least one item of media content corresponding to the at least one piece of information in the online list that has been downloaded.

17. The non-transitory computer readable storage medium of claim 16, wherein when there is not the at least one item of media content corresponding to the at least one piece of information in the online list that has been downloaded, the operations further comprise presenting the display window in which the list information of the online list is displayed.

18. The non-transitory computer readable storage medium of claim 13, the operations further comprising:

determining a next item of media content to be played after the item of media content is finished based on current list information presented in the display window.

* * * * *